(12) United States Patent
Deen et al.

(10) Patent No.: US 7,390,353 B2
(45) Date of Patent: Jun. 24, 2008

(54) SYSTEM FOR REMOVING WATER FROM FLUE GAS

(75) Inventors: Philip G. Deen, Enterprise, FL (US); Terrence B. Sullivan, Orlando, FL (US)

(73) Assignee: Siemens Power Generation, Inc., Orlando, FL (US)

( * ) Notice: Subject to any disclaimer, the term of this patent is extended or adjusted under 35 U.S.C. 154(b) by 378 days.

(21) Appl. No.: 11/183,696

(22) Filed: Jul. 18, 2005

(65) Prior Publication Data

US 2007/0012187 A1  Jan. 18, 2007

(51) Int. Cl.
*B01D 53/14* (2006.01)
*B01D 53/28* (2006.01)

(52) U.S. Cl. .......................... 96/242; 110/215
(58) Field of Classification Search ............ 96/234, 96/242, 243, 290; 95/149, 228, 229, 231; 110/203, 215; 60/311, 310; 62/600, 606, 62/617
See application file for complete search history.

(56) References Cited

U.S. PATENT DOCUMENTS

| | | | | |
|---|---|---|---|---|
| 1,855,615 A * | 4/1932 | Sperr, Jr. ...................... 95/93 |
| 1,861,158 A * | 5/1932 | Hilger .......................... 96/244 |
| 1,905,068 A * | 4/1933 | Sperr, Jr. .................. 261/140.1 |
| 2,214,880 A * | 9/1940 | Crawford ....................... 95/10 |
| 3,018,231 A * | 1/1962 | Kelley et al. ................ 202/158 |
| 3,609,942 A * | 10/1971 | Alleman ....................... 95/192 |
| 3,962,864 A | 6/1976 | Williams et al. |
| 4,941,324 A * | 7/1990 | Peterson et al. ................ 62/94 |
| 5,203,161 A | 4/1993 | Lehto |
| 5,265,410 A | 11/1993 | Hisatome |
| 5,544,479 A | 8/1996 | Yan et al. |
| 5,715,673 A | 2/1998 | Beichel |
| 5,843,214 A | 12/1998 | Janes |
| 6,079,212 A | 6/2000 | Tatani et al. |
| 6,156,102 A * | 12/2000 | Conrad et al. ................ 95/172 |
| 6,247,302 B1 | 6/2001 | Tsukamoto et al. |
| 6,286,301 B1 | 9/2001 | Utamura |
| 6,488,740 B1 | 12/2002 | Patel et al. |
| 6,592,829 B2 | 7/2003 | Chakravarti et al. |
| 6,804,964 B2 | 10/2004 | Bellows et al. |
| 2001/0020360 A1 | 9/2001 | Tsukamoto et al. |
| 2001/0039797 A1 | 11/2001 | Cheng |
| 2002/0023423 A1 | 2/2002 | Viteri et al. |
| 2002/0026783 A1 | 3/2002 | Utamura |

* cited by examiner

*Primary Examiner*—Frank M Lawrence

(57) ABSTRACT

A system (10) for removing water from a flue gas (12) includes a heat exchanger (16) for receiving a flow of heat exchanging fluid and the flue gas (12). An absorber (40) may have a gas inlet (41) for receiving the flue gas (12) from the heat exchanger (16), an inlet (45) for receiving a desiccant solution and a media (42) receiving the desiccant solution for providing surface area contact between the flue gas (12) and the desiccant solution A dual cooler (26) may include a first side (27) through which a heat exchanging fluid and the desiccant solution may be directed for cooling. Valving (72) may be provided for alternating a flow of the heat exchanging fluid and a flow of the desiccant solution through the first side (27) of the dual cooler (26).

19 Claims, 4 Drawing Sheets

SYSTEM FOR REMOVING WATER FROM FLUE GAS

FIELD OF THE INVENTION

This invention relates generally to the field of removing water from a flue gas and more particularly to the removing water from an exhaust gas produced by the combustion of a fossil fuel.

BACKGROUND OF THE INVENTION

Water is a natural byproduct of the combustion of hydrocarbon or fossil fuels. Permits for water are becoming increasingly difficult to obtain for power plants, which consume relatively large volumes of water during operation. In some cases, the difficulty with obtaining water permits for wells or use of surface water may preclude construction of a needed power plant. Thus, recovering water from power plants is desirable to obviate the need of obtaining water permits.

Fossil fuel exhaust or flue gas, such as that exhausted from a combustion turbine engine or downstream of a coal-fired boiler, can contain 10% volume concentration of water depending on ambient conditions, fuel composition, inlet air treatment, fuel treatment, flue gas treatment and other factors. At this concentration, water has a partial pressure of 1.47 psia and a saturation temperature of 115° F. If the flue gas were cooled and the vapor pressure lowered, a portion of that water could be recovered. It is known that cooling the exhaust stream in a condenser to below the precipitation temperature of the moisture in the exhaust gas will result in the condensation of a portion of the moisture contained in the exhaust gas. The quantity and percentage of the moisture recovered is a function of the temperature to which the exhaust can be cooled by the condenser.

However, since the recovery of the water is expensive, the usual site for such plants would be a desert where daytime temperatures are high, frequently approaching 118° F. Ambient air is commonly the ultimate heat sink for condensers, and the ambient air temperature thus determines the amount of moisture that can be removed by a condenser. In an arid desert environment, where it is most likely that water recovery will be desired the effectiveness of water removal by an ambient air-cooled condenser is limited. Given such high ambient temperatures and the limits of heat exchange equipment, direct condensation alone becomes technically untenable.

DETAILED DESCRIPTION OF THE INVENTION

Figure 1:
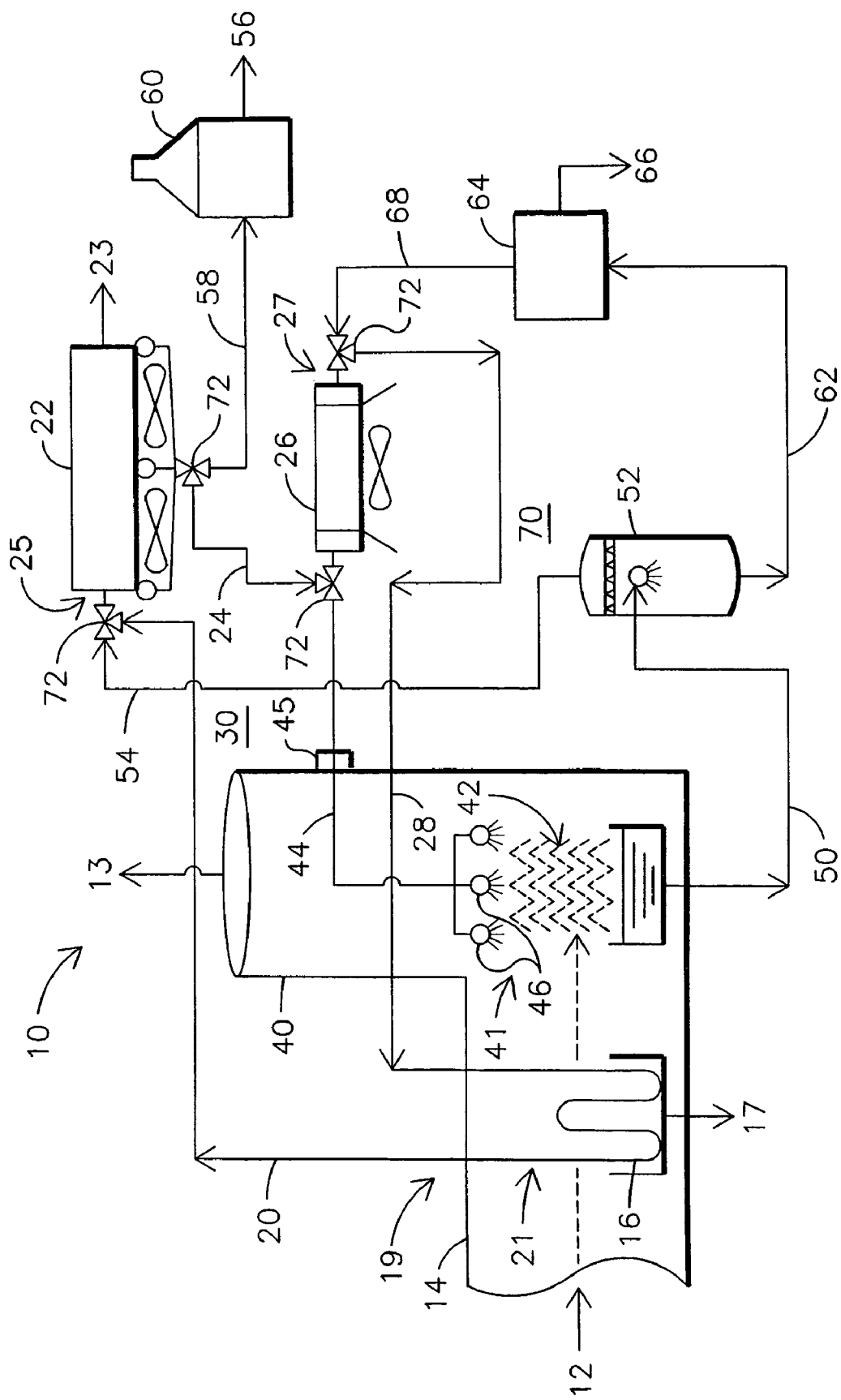
FIG. 1 is a schematic diagram of an exemplary embodiment of a system for removing water from a flue gas.

FIG. 1 is a schematic diagram of an exemplary embodiment of a water recovery system 10 for recovering water from a flue or exhaust gas 12. System 10 may be used to recover water from a flue gas produced using a fossil fuel to generate power such as a combustion turbine power plant. One such power plant is a Model SGT5-5000F sold by Siemens Westinghouse Power Corporation, the assignee of the present invention. It will be appreciated that embodiments of system 10 may be used with various types of plants combusting fossil fuels in a combustor or furnace such as coal-fired, oil-fired or biomass-fired plants.

Before flue gas 12 is released to the ambient atmosphere 13, it is first treated by water recovery system 10. FIG. 1 illustrates that flue gas 12 exiting a power plant (not shown) may be directed through a shell or duct 14 to pass through a heat exchanger 16. Heat exchanger 16 may be configured with heat exchanger coils or as a direct contact heat exchanger, for example, for recovering a quantity of water from flue gas 12. Alternate types of heat exchangers may be used. Heat exchanger 16 may have a first side 19 into which a heat exchanging fluid may flow and a second side through which flue gas 12 may flow as recognized by those skilled in the art. Heat exchanger 16 may be a direct condensation system that condenses water vapor from flue gas 12 that may be recovered as water. The recovered water 17 may exit heat exchanger 16 through a conventional fluid connection and be collected for delivery through appropriate fluid connections to various power plant systems for reuse.

A heat exchanging fluid or solution, such as water or glycol may be pumped through fluid connection 20 from heat exchanger 16 to and through an air-cooled condenser 22 for a first stage of cooling that fluid. Condenser 22 may have a first side 25 through which fluid may flow and a second side through which air may flow. Non-condensable constituents 23 may be pumped from condenser 22 during desiccant-based water recovery described herein. The fluid may then be pumped from condenser 22 through fluid connection 24 to and through a dual cooler 26 for a second stage of cooling the fluid. Dual cooler 26 may be a condenser and may have a first side 27 through which fluid may flow and a second side through which air may flow. The fluid may exit dual cooler 26 and be pumped through fluid connection 28 back to heat exchanger 16, which removes heat from flue gas 12 via condensation of water vapor.

Fluid connections 20, 24, 28 form a cooling circuit 30 that may include a first side 19 of heat exchanger 16, a first side 25 of condenser 22 and a first side 27 of dual cooler 26 through which heat exchanging fluid may be pumped for first and second stages of cooling. Heat exchanging fluid may be provided to cooling circuit 30 from a conventional source (not shown) including but not limited to recovered water 17.

In an exemplary embodiment of system 10, after passing through heat exchanger 16, flue gas 12 may pass into an absorber 40 through a gas inlet 41, which may be a direct contact heat exchanger for removing water from flue gas 12. Flue gas 12 may enter absorber 40 at approximately 200° F.-300° F., or hotter and contain approximately 5%-10% by volume of moisture, or more. Absorber 40 may define an interior portion or plenum that includes a fill material or media 42, such as polyethylene, ceramic or metal for providing surface area contact between flue gas 12 and a flow of a desiccant solution for cooling flue gas 12 and removing water there from. The desiccant solution is used to chemically absorb water from flue gas 12 and may flow into absorber 40 through inlet 45 of fluid connection 44 and be dispersed onto media 42 such as through nozzles 46. The desiccant solution may contain various desiccant compounds such as calcium chloride ($CaCl_2$), lithium bromide, lithium chloride, various hydroxides such as lithium hydroxide or sodium hydroxide, or organic liquids such as polypropylene glycol, or mixtures thereof, for example.

Moisture is removed from flue gas 12 in absorber 40 through a highly exothermic process. This process causes the temperature of the $CaCl_2$ solution to increase with the concentration of $CaCl_2$ in the desiccant solution decreasing by weight. As the moisture content in the desiccant solution increases, moisture in flue gas 12 decreases with the temperature of the desiccant solution rising. The final temperature and concentration of the $CaCl_2$ desiccant solution exiting absorber 40 depend on the relative quantity and inlet temperature of the $CaCl_2$ desiccant solution, and the moisture content and temperature of flue gas 12 entering absorber 40.

The chemical absorption of moisture is a highly exothermic process. The desiccant solution may exit absorber 40 through fluid connection 50 and be pumped to a regenerator 52, which may be one such as that disclosed in U.S. Pat. No. 6,804,964, which is specifically incorporated herein by reference. The desiccant solution from heat exchanger 16 may be directed to regenerator 52 where a source of heat (not shown) heats the desiccant solution to reverse the absorption process and drive off moisture recovered from exhaust gas 12.

A flow of water vapor or steam is produced from regenerator 52, which may be directed to air-cooled condenser 22 through fluid connection 54 where it is cooled to produce a flow of recovered water 56. The flow of recovered water 56 may exit condenser 22 and be pumped through fluid connection 58 to a reservoir 60 from which the recovered water may be directed to power plant systems such as cooling circuit 30 or other systems, as desired. It will be appreciated that embodiments of the present invention may employ a sub-atmospheric regenerator (not shown) such as that disclosed in U.S. Pat. No. 6,804,964 as recognized by those skilled in the art.

The desiccant solution may exit regenerator 52 and be pumped through fluid connection 62 to a desiccant treatment system 64, which may remove trace contaminants 66 from the solution. System 64 may be a full flow system or slipstream system in which a fraction of the desiccant solution is siphoned away, treated and returned depending on operational specifications. The desiccant solution may then be pumped through fluid connection 68 to and through the first side 27 of dual cooler 26, where the solution is further cooled. The cooler desiccant solution may exit dual cooler 26 and be pumped through fluid connection 44 to re-enter absorber 40 for further water removal from flue gas 12. Fluid connections 44, 50, 62 and 26 form a desiccant circuit 70 that may include regenerator 52, desiccant treatment system 64, the first side 27 of dual cooler 26 and absorber 44 through which an aqueous desiccant solution may be pumped for water recovery from flue gas 12 in absorber 40.

An embodiment of the invention allows for controlling appropriate valves 72 and associated pumps (not shown) to independently control the flow of heat exchanging fluid through cooling circuit 30 and the flow of desiccant solution through desiccant circuit 70. Independently controlling these flows allows for the first side 27 of dual cooler 26 to be selectively or alternately used for cooling the flow of heat exchanging fluid or desiccant solution as a function of the operating specifications of the associated power plant or desired treatment of flue gas 12. For example, embodiments of the system of FIG. 1 allow for cooling circuit 30 and desiccant circuit 70 to operate alternately sharing the first side 27 of dual cooler 26. This alternate operation allows for optimizing the removal of water from flue gas 12 when a power plant is operating at different loads. A flushing system (not shown) may be provided to flush out appropriate components of cooling circuit 30 and/or desiccant circuit 70 in the event such components share the fluid flow, such as the first side 27 of dual cooler 26.

Figure 2:
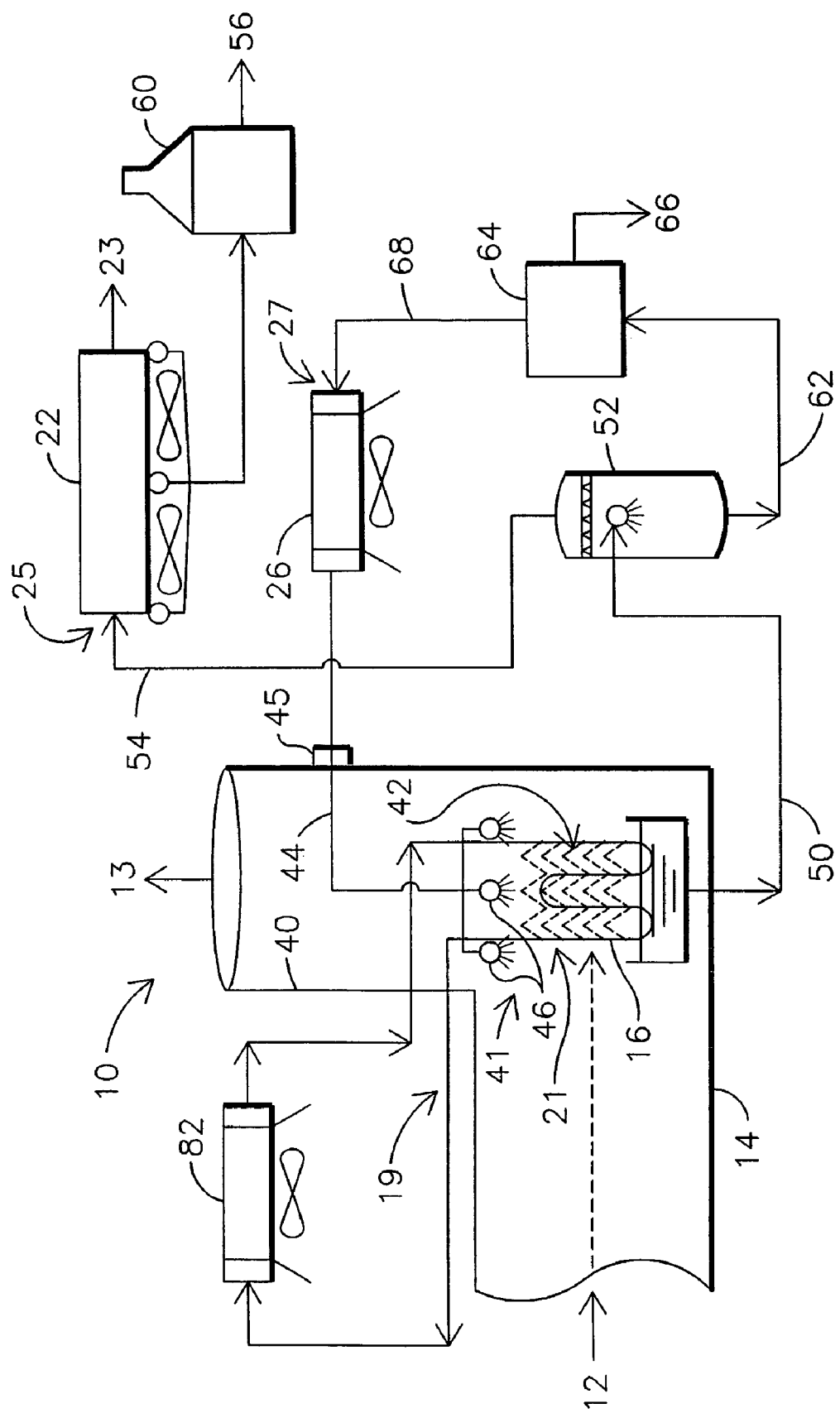
FIG. 2 is a schematic diagram of an exemplary embodiment of a system for removing water from a flue gas.

FIG. 2 is a schematic diagram of another exemplary embodiment of a water recovery system 10 for recovering water from a flue or exhaust gas 12 where like components have like reference numerals. FIG. 2 illustrates that heat exchanger 16 may be contained within an interior portion or plenum of absorber 40. This arrangement allows for the affects of heat exchanger 16 and absorber 40 to operate simultaneously on flue gas 12, which may achieve a more efficient removal of water there from.

Within absorber 40, the removal of water from flue gas 12 using a desiccant solution involves condensing the water vapor, which is an exothermic process. The release of heat causes the bulk temperature within the absorber plenum to increase as desiccant removes water from flue gas 12, which impedes the process of further condensation within absorber 40. The heat generated within the plenum of absorber 40 may not be evenly distribution throughout the plenum thereby forming a temperature gradient within the plenum. Heat exchanger 16 may be positioned within absorber 40 to account for temperature gradients within the plenum and optimize the performance of absorber 40. In this respect, an exemplary heat exchanger 16 may include heat exchanger coils, or other heat exchanging configurations that are non-linearly distributed within absorber 40. For example, a non-linear distribution may include a higher concentration of heat exchanging coils positioned within absorber 40 where the temperatures within the absorber plenum are higher. This allows for heat exchanger 16 to optimize performance of absorber 40 by maximizing a reduction in the overall bulk temperature within absorber 40.

An advantage of embodiments of system 10 shown in FIG. 2 is that the exterior surface of heat exchanger 16 will have lower temperatures relative to the ambient environment or bulk temperature of desiccant solution within absorber 40. Localized cold spots may be produced within absorber 40 by operating heat exchanger 16 within absorber 40. This lower temperature maintains the bulk temperature of the desiccant solution being admitted onto media 42 lower than it would otherwise be while reacting with flue gas 12. This allows for maintaining or reducing the partial pressure of the desiccant solution stream within absorber 40. Heat exchanger 16 may be co-located with media 42 within absorber 40 in various configurations such as routing heat exchanger coils through media 42 or positioning the coils adjacent media 42, for example, as well as other configurations to optimize the combined effects of heat exchanger 16 and absorber 40.

Co-locating heat exchanger 16 proximate media 42 within absorber 40 allows for reducing the partial pressure of desiccant solution and maintaining the lower partial pressure thereby increasing the volume of recovered water 56. A fluid connection 80 may direct the flow of pumped heat exchanging fluid from heat exchanger 16 to a direct condensation cooler 82. The inventors of the present invention have determined that while there is not a linear relationship between the temperature of desiccant and it's partial pressure, a greater than linear benefit may be achieved in water recovery by keeping the desiccant cool while it's removing water from flue gas 12.

This may be achieved by locating heat exchanger 16 within the plenum of absorber 40, which removes bulk heat and allows the desiccant reaction to proceed at a lower average temperature than otherwise would have been attained. The overall effect is the whole plenum within absorber 40 is kept cooler thereby increasing the amount of recovered water 56. Locating heat exchanger 16 within absorber 40 limits the increase in desiccant temperature within the desiccant solution and decreases the overall temperature of the sorption process.

Figure 3:
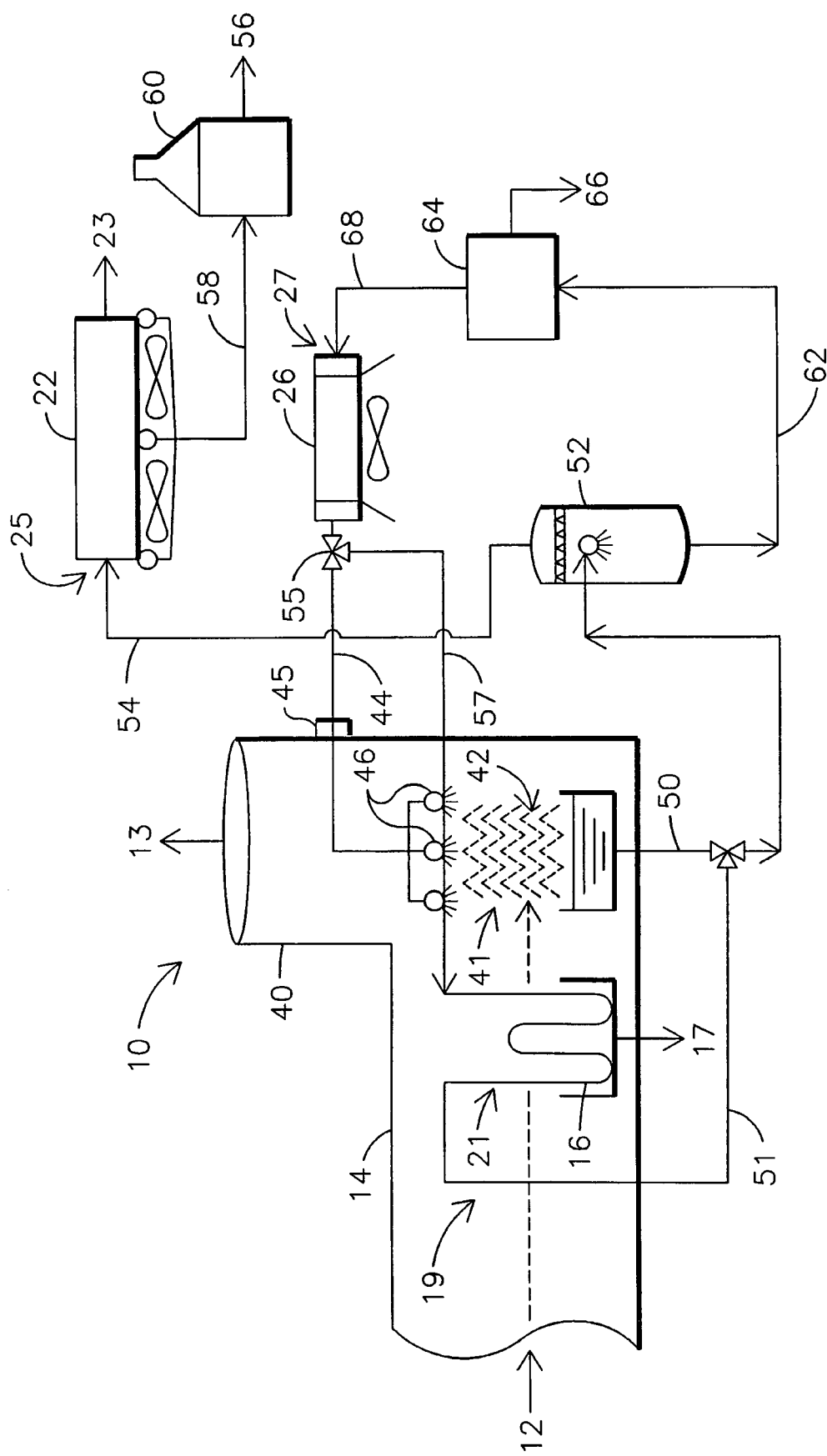
FIG. 3 is a schematic diagram of an exemplary embodiment of a system for removing water from a flue gas.

FIG. 3 is a schematic diagram of another exemplary embodiment of a water recovery system 10 for recovering water from a flue or exhaust gas 12 where like components have like reference numerals. Embodiments of system 10 shown in FIG. 3 may use a desiccant solution containing $CaCl_2$, lithium bromide or tri-ethylene glycol, for example as the working fluid for direct condensation using heat exchanger 16 and desiccant absorption within absorber 40. Heat exchanger 16 may be located upstream of absorber 40 so that a portion of water vapor within flue gas 12 may be condensed as recovered water 17. Flue gas 12 may then enter absorber 40 and be treated with the desiccant solution sprayed within absorber 40 via spray nozzles 46. Alternate embodiments allow for heat exchanger 16 to be co-located with media 42 within absorber 40.

The desiccant solution may exit absorber 40 and be pumped through fluid connection 50 to regenerator 52. After passing through heat exchanger 16, the solution may exit the heat exchanger and be pumped through fluid connection 51 to fluid connection 50 and to regenerator 52. The desiccant solution may exit regenerator 52 and be pumped through fluid connections 62 and 68 to dual cooler 26. Valve 55 may be provided for controlling the flow of desiccant solution through fluid connection 44 and fluid connection 57, which direct the flow of desiccant solution back to absorber 40 and heat exchanger 16. In this aspect, the amount of desiccant solution between connections 44, 57 may be balanced or optimized depending on operating parameters.

Figure 4:
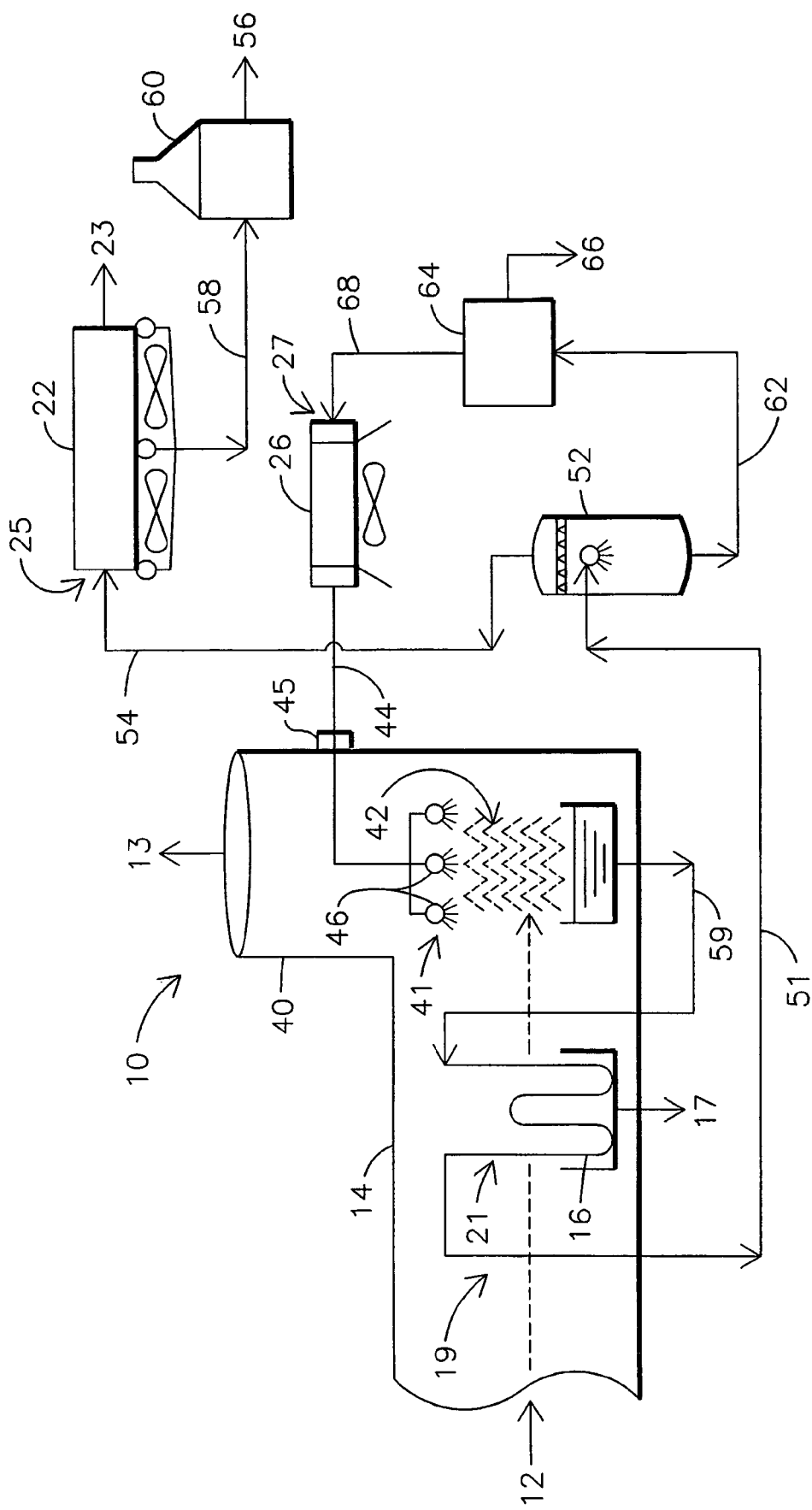
FIG. 4 is a schematic diagram of an exemplary embodiment of a system for removing water from a flue gas.

FIG. 4 is a schematic diagram of another exemplary embodiment of a water recovery system 10 for recovering water from a flue or exhaust gas 12 where like components have like reference numerals. Embodiments of system 10 shown in FIG. 4 may use a desiccant solution as the working fluid for direct condensation using heat exchanger 16 and desiccant absorption within absorber 40. Heat exchanger 16 may be located upstream of absorber 40 so that a portion of water vapor within flue gas 12 may be condensed as recovered water 17. Flue gas 12 may then enter absorber 40 and be treated with the desiccant solution sprayed within absorber 40 via spray nozzles 46. Alternate embodiments allow for heat exchanger 16 to be co-located with media 42 within absorber 40.

The desiccant solution may exit absorber 40 and be pumped through fluid connection 59 to heat exchanger 16. In this exemplary embodiment, the desiccant solution is pumped from cooler 26 through a single loop that passes through absorber 40 and heat exchanger 16. This embodiment allows for one stream of desiccant solution to be used, which means a lower mass flow rate of solution. This may lower equipment sizes because less fluid is being pumped, which may reduce capital costs.

In one aspect, embodiments of the invention are advantageous in that they allow a condensation system, which operates efficiently at lower ambient temperatures, to share equipment with a desiccant-based system, which is more efficient at higher ambient temperatures. Operating these systems together using shared equipment allows for optimizing water recovery efficiency across the ambient temperature range and reduces capital equipment costs due to equipment sharing.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim as our invention:

1. A system for removing water from a flue gas produced using a fossil fuel, the system comprising:
   a heat exchanger comprising a first side for receiving a flow of heat exchanging fluid and a second side for receiving the flue gas, the heat exchanger cooling the flue gas sufficiently to cause a condensation of water vapor contained in the flue gas;
   an absorber comprising a gas inlet for receiving the flue gas from the heat exchanger, an inlet for receiving a desiccant solution and a media receiving the desiccant solution for providing surface area contact between the flue gas and the desiccant solution for chemically absorbing water from the flue gas;
   a dual cooler comprising a first side;
   a heat exchanging fluid circuit comprising the first side of the dual cooler and the first side of the heat exchanger;
   a desiccant solution circuit comprising the first side of the dual cooler and the desiccant solution inlet of the absorber; and
   valving for alternating a flow of the heat exchanging fluid and a flow of the desiccant solution through the first side of the dual cooler.

2. The system of claim 1 wherein the heat exchanger is co-located proximate the media within the absorber.

3. The system of claim 2 wherein the heat exchanger is co-located proximate the media within the absorber to optimize performance of the absorber.

4. The system of claim 3, the heat exchanger comprising heat exchanging coils non-linearly distributed within the absorber.

5. The system of claim 1 further comprising a condenser comprising a first side for receiving the flow of heat exchanging fluid wherein the heat exchanging fluid circuit directs the flow of heat exchanging fluid through the first side of the condenser for cooling the heat exchanging fluid.

6. The system of claim 1, the desiccant solution comprising one of the group of calcium chloride, lithium bromide, sodium hydroxide, polypropylene glycol, and mixtures thereof.

7. The system of claim 1 further comprising a regenerator having an inlet for receiving the desiccant solution at a first concentration of desiccant from the absorber, the regenerator producing water vapor and a desiccant solution at a concentration of desiccant higher than the first concentration.

8. A system for removing water from a flue gas produced by the combustion of a fossil fuel, the system comprising:
   a heat exchanger comprising a first side for receiving a flow of heat exchanging fluid comprising a desiccant and a second side for receiving the flue gas, the heat exchanger cooling the flue gas sufficiently to cause a condensation of water vapor contained in the flue gas;
   an absorber comprising a gas inlet for receiving the flue gas from the heat exchanger, a fluid inlet for receiving the heat exchanging fluid and a media receiving the heat exchanging fluid from the fluid inlet for providing surface area contact between the flue gas and the heat exchanging fluid for chemically absorbing water contained in the flue gas with the desiccant; and
   a heat exchanging fluid circuit comprising the first side of the heat exchanger and the absorber whereby the heat exchanging fluid circuit directs the flow of the heat exchanging fluid through both of the heat exchanger and the absorber.

9. The system of claim 8 wherein the heat exchanger is co-located proximate the media within the absorber.

10. The system of claim 9, the heat exchanger comprising heat exchanging coils distributed within the absorber to maximize reduction of a bulk temperature within the absorber.

11. The system of claim 10 wherein the heat exchanging coils are non-linearly distributed within the absorber.

12. The system of claim 8 further comprising a dual cooler comprising a first side for receiving the heat exchanging fluid.

13. The system of claim 8 further comprising valving for controlling a relative rate of flow of the heat exchanging fluid to the fluid inlet of the absorber and the first side of the heat exchanger.

14. A power plant comprising:
a fossil fuel combustor emitting a flue gas;
an absorber comprising a plenum receiving the flue gas;
a media within the plenum for providing surface area contact between the flue gas and a desiccant solution;
a heat exchanger co-located proximate the media within the plenum of the absorber;
a dual cooler comprising a first side;
a heat exchanging fluid circuit comprising the first side of the dual cooler and a first side of the heat exchanger, the heat exchanging fluid circuit directing a heat exchanging fluid through the heat exchanger for sufficiently cooling the flue gas to cause condensation of water vapor contained in the flue gas;
a desiccant solution circuit comprising the first side of the dual cooler and the absorber, the desiccant solution circuit directing a flow of the desiccant solution onto the media so the desiccant solution directly contacts the flue gas to chemically absorb water contained in the flue gas; and
valving for alternating a flow of the heat exchanging fluid and a flow of the desiccant solution through the first side of the dual cooler.

15. The power plant of claim 14 further comprising a condenser comprising a first side wherein the heat exchanging fluid circuit directs the flow of heat exchanging fluid through the first side of the condenser for cooling the heat exchanging fluid.

16. The power plant of claim 14, the heat exchanger comprising heat exchanging coils distributed within the plenum of the absorber to maximize reduction of a bulk temperature within the absorber.

17. The power plant of claim 16 wherein the heat exchanging coils are non-linearly distributed within the plenum of the absorber.

18. A power plant comprising:
a fossil fuel combustor emitting a flue gas;
an absorber comprising a plenum receiving the flue gas;
a media within the plenum for providing surface area contact between the flue gas and a desiccant solution;
a heat exchanger co-located proximate the media within the plenum of the absorber; and
a fluid circuit comprising a first side of the heat exchanger and the absorber whereby the fluid circuit directs a flow of a solution comprising a coolant and a desiccant through both of the heat exchanger and the absorber.

19. The power plant of claim 18, the heat exchanger comprising heat-exchanging coils distributed within the plenum of the absorber to maximize reduction of a bulk temperature within the absorber.

* * * * *